United States Patent [19]

Taylor

[11] Patent Number: 4,597,972
[45] Date of Patent: Jul. 1, 1986

[54] NISIN AS AN ANTIBOTULINAL AGENT FOR FOOD PRODUCTS

[75] Inventor: Stephen L. Taylor, Madison, Wis.

[73] Assignee: Aplin & Barrett, Ltd., Dorset, England

[21] Appl. No.: 585,864

[22] Filed: Mar. 2, 1984

Related U.S. Application Data

[63] Continuation-in-part of Ser. No. 543,968, Oct. 20, 1983, which is a continuation of Ser. No. 503,305, Jun. 10, 1983, abandoned.

[51] Int. Cl.⁴ .................. B29D 29/00; B29D 35/00
[52] U.S. Cl. ........................................ 426/36; 426/9; 426/38; 426/52; 426/56; 426/330.2; 426/334; 426/582
[58] Field of Search ............... 426/36, 38, 52, 56, 426/9, 334, 330.2, 582

[56] References Cited

U.S. PATENT DOCUMENTS

| | | | |
|---|---|---|---|
| 2,744,827 | 5/1956 | Mattick et al. | 426/9 |
| 3,579,354 | 5/1971 | Kasik et al. | 426/36 |
| 3,899,594 | 8/1975 | Nickerson et al. | 426/52 |
| 3,975,546 | 8/1976 | Stahmann | 426/52 |
| 4,158,607 | 6/1979 | Kalinowski et al. | 426/36 |
| 4,205,132 | 5/1980 | Sandine et al. | 426/36 |
| 4,318,928 | 3/1982 | Sing | 426/36 |
| 4,477,471 | 10/1984 | Gonzalez | 426/36 |

FOREIGN PATENT DOCUMENTS

| | | | |
|---|---|---|---|
| 511616 | 4/1955 | Canada | 426/36 |
| 713251 | 3/1952 | United Kingdom | 426/36 |
| 739097 | 6/1980 | U.S.S.R. | 426/36 |

OTHER PUBLICATIONS

Scott et al., J. Food Sci., 46(1) 117–126 (1981).
Somers et al., J. Food Sci., 46(6) 1972–1973 (1981).
Cann et al., "Evaluation of Antibotulinal Properties of Nisin in Fresh Fish Packed in Modified Atmosphere," Torry Research Station Publication, Ministry of Agriculture, Fisheries and Food, Aberdeen, Scotland.

*Primary Examiner*—Christine M. Nucker
*Attorney, Agent, or Firm*—Cushman, Darby & Cushman

[57] ABSTRACT

Processed foods and food products are prepared by including from 2,000 to 10,000 I.U. of nisin to prevent the outgrowth of *Clostridium botulinum* spores.

16 Claims, No Drawings

NISIN AS AN ANTIBOTULINAL AGENT FOR FOOD PRODUCTS

CROSS-REFERENCE TO RELATED APPLICATIONS

This application is a continuation-in-part of my earlier application Ser. No. 543,968 filed Oct. 20, 1983, which in turn is a continuation of my earlier application Ser. No. 503,305 filed June 10, 1983 now abandoned.

BACKGROUND OF THE INVENTION

Nisin, an antimicrobial substance produced by certain strains of *Streptococcus lactis*, has known food preservative use. It has the property of inhibiting the growth of certain Gram-positive bacteria, but not Gram-negative ones or yeasts or molds. A further, and most important practical property, lies in the ability of nisin to prevent the outgrowth of germinate bacterial spores. The commercial use of nisin to date very much relates to the property of preventing the outgrowth of germinated bacterial spores, in some applications that involves the prevention of spoilage in foods which have received at least sufficient heat treatment to destroy vegetative bacterial cells. Another classic use has been for the prevention of clostridial spoilage in process cheese products.

The use of nisin in process cheese products has been the subject of earlier patents; see British Pat. No. 713,251 and U.S. Pat. No. 2,744,827 dated 1954 and 1956, respectively. These patents relate to the manufacture or preservation of cheese of kinds liable to become blown or distended due to the growth of spoilage organisms which are anaerobic sporeformers, typically bacteria known as Clostridia. They also relate to process cheese which is liable to be spoiled as above. The levels of nisin referred to in these patents are in the range of 50 to 375 units per gram. One "unit" is equivalent to 1 International Unit (I.U.) of Nisin activity and is equivalent to 0.025 microgram of Nisin.

Until recent times it was not considered that process cheese products would be liable to spoilage by *Clostridium botulinum* organisms or that the production of the associated toxin would present a potential health risk. Recent findings however are that such risks can exist, particularly in process cheese formulations where the water content is in excess of 54 percent. See Kautter et al "Toxin Production by *Clostridium botulinum* in Shelf-Stable Pasteurized Process Cheese Spreads". Journal of Food Protection, 42 pp. 784–786 (1979); Tanaka et al. "A Challenge of Pasteurized Process Cheese Spreads with *Clostridium botulinum* spores", Journal of Food Protection, 42 pp. 787–789 (1979); Scott and Taylor, "Effect of Nisin on the Outgrowth of *Clostridium botulinum* Spores", J. Food Sci., 46(1) pp. 117–120 (1981); Scott and Taylor, "Temperature, pH, and Spore Load Effects on the Ability of Nisin to Prevent on the Outgrowth of *Clostridium botulinum* Spores", J. Food Sci. 46(1): 121–126 (1981); and Somers and Taylor, Research Note—"Further Studies on the Antibotulinal Effectiveness of Nisin in Acidic Media", J. Food Sci., 46(6): p. 1972-3.

Our studies at the fundamental level have shown that nisin does have the ability to inhibit growth of botulinum spores from different culture and type sources. The significant finding, however, is that the levels of nisin required to effect complete inhibition are substantially higher for *Clostridium botulinum* than for other non-pathogenic clostridia or aerobic sporeformers commonly encountered as food spoilage organisms. We have further demonstrated in a protracted shelf-life study with high-moisture, reduced sodium process cheese spread that complete inhibition of *Clostridium botulinum* spore outgrowth is achieved at a nisin addition level of 250 ppm (10,000 IU nisin/gram). This nisin level is 20 times the maximum addition rate in current commercial practice.

A demand is present for a reliable antibotulinal agent to be used in foods and food systems susceptible to *C. botulinum* growth either to supplement current used materials such a nitrate and sorbate or as the sole antibotulinal agent used in such foods.

BRIEF DESCRIPTION OF THE INVENTION

The present invention includes a process for substantially completely inhibiting the outgrowth of germinated *Clostridium botulinum* spores in food products. Included herein is the use of nisin in high moisture content pasteurized process cheese spreads, typically having a moisture content in the range of about 54 to about 60% by weight and having reduced sodium levels in the range of 40 to about 50% reductions in added sodium salts from the typical commercial formulations (which contain 2.55% disodium phosphate and 2.0% sodium chloride), comprising treating this process cheese by adding to it an amount of nisin or nisin-producing bacterial culture sufficient to inhibit botulinum spore outgrowth, the amount generally being from about 2,000 to about 10,000 International Units (or equivalent). This is the subject of my earlier applications Ser. Nos. 503,305 and 543,968, identified above, the disclosures of which are hereby incorporated by reference.

The use of nisin to control heat-resistant spores of *Clostridum botulinum* may be applied to broad categories of foods and edible food products, especially those products known or determined to be susceptible and/or hospitable to *C. Botulinum* growth. Low acid foods with pH values above about 4.5 such as tomato products, cold meat products, wet fish systems and the like are examples. The use of significant amounts of nisin sufficient to control the outgrowth of *C. botulinum* spores and the elaboration of botulinum spores therefrom in the following foods is specifically contemplated: canned peas and beans, canned mushrooms, canned tomato products, soups and the like. Nisin delays toxin production by *C. botulinum* type E spores in cod filets stored at 80° F. and exhibits antibotulinal effects either alone or with nitrite in chicken frankfurter emulsion. The required amount of nisin is conveniently mixed into the food in such a way as to bring it into contact with any spores which are present.

The quantity of nisin applied necessary to control the growth of *Clostridum botulinum* spores and to impede or prevent the elaboration of botulinum toxin therefrom depends upon numerous factors including the nature of the food itself, pH, spore loading both prior to and after processing, packing conditions and practices, etc. The requisite amount of nisin may be determined by testing procedures in the manner of those described below. As a guideline the following dosages may be considered:
    canned peas and beans: 100–150 mg/kg
    canned mushrooms: 100–200 mg/kg
    canned soups: 100–200 mg/kg
    canned tomato products: 50–100 mg/kg
        (pH typically below 4.5)

Toxicological evaluation by the Joint FAO/WHO Expert Committee of Food Additives noted in 1968 that evidence then available indicated that a level of 3,300,000 International Units of nisin per Kg of bodyweight had no adverse effect. This finding permits an unconditional ADI of 33,000 units per Kg body weight at which level nisin has no microbiological, toxic, or allergic effects. Thus an amount of nisin will be used that achieves the required antibotulinal effect yet is well within accepted toxicological limits.

Human botulism is almost invariably the result of eating preserved foods in which the bacteria, Clostridium botulinum, has grown and produced toxin. It appears that, for example, as the moisture content of nonrefrigerated, pasteurized process cheese spreads or products increases, so too does the incidence of toxin produced by Clostridium botulinum. The species Clostridium botulinum is divided into Types A through G on the basis of antigenic differences between the toxins: Types A, B, and E are of practical significance in the United States because they are the ones that are most commonly involved in human intoxications. Of these, Type A toxin is the most potent toxin and is reported to be the most potent toxic substance known.

Nisin is a polypeptide produced by some Streptococcus lactis strains of lactic streptococci. The World Health Organization Committee on Biological Standardisation has established an international reference preparation of nisin, and the international unit (IU herein) is defined as 0.001 mg of this preparation. The most potent Nisin preparation prepared contains 40 million IU per gram. NISAPLIN is a commercial Nisin concentrate containing 1 million IU per gram commercially available from Aplin & Barrett Ltd., Trowbridge, Wiltshire, England.

DESCRIPTION OF THE PREFERRED EMBODIMENTS

To determine the effectiveness of nisin in preventing the outgrowth of Clostridium botulinum spores and subsequent toxin formation in process cheese spreads, the following experiments were conducted.

Bacterial cultures: Five strains each of Clostridium botulinum types A and B (A: 56, 62, 69, 77, and 90; B: 53, 113, 213, 13983, and Lamanna-okra) were used. Each strain was grown in a manner conducive to sporulation as in Christiansen et al, Appl. Microbiol. 27, pp. 733-737. The spore crops were harvested by centrifugation followed by thorough washing with sterile water. The final pellet was resuspended in sterile water to 10 ml. Each individual spore suspension was thawed and diluted in 0.1% peptone-water for enumeration of the spores (see below). After enumeration, suitable dilutions of the individual spore preparations in sterile water were made and combined to produce a mixed inoculum consisting of approximately equal numbers of each strain. These mixed spore preparations wee suitably diluted in 0.1% peptone-water prior to addition to the melted cheese.

Enumeration of C. botulinum: Enumeration of C. botulinum was conducted by the 5-tube Most Probable Number (hereinafter MPN) technique using TPYG as the growth medium according to the FDA Bacteriological Analytical Manual for Foods (1976). For spore counts, the spore suspensions were diluted in 0.1% peptone-water and heat-shocked at 80° C. for 10 min. prior to enumeration. With stored process cheese spread samples, similar heat-shocking methods were used. Tubes showing bacterial growth were teted for the presence of toxin by the mouse protection assay. Only toxin-positive tubes were counted in determining the Most Probable Number of C. botulinum. TPYG medium consisted of 5% trypticase peptone, 0.5% bactopeptone, 2% yeast extract, 0.4% glucose, and 0.1% sodium thioglycollate. The pH of TPYG medium was adjusted to 6 prior to autoclaving. The pH of The peptone-water was not adjusted prior to autoclaving.

Extraction and assay of Toxin: The procedure of Tanaka et al, noted above, was used for the extraction and assay of the toxin. Ten grams of each test sample were mixed with an equal volume of gelatin-phosphate buffer, pH 6.2. The mixture was centrifuged at 5000×g for 10 min and the aqueous supernatant fraction was analyzed for the presence of toxin. The extraction procedure allowed complete recovery of added toxin. For toxin assays of TPYG broth employed in the MPN procedure, the medium was centrifuged at 5000×g for 10 min, and the supernatant was analyzed for the presence of toxin.

In the mouse protection assay for botulinal toxin (FDA Bacteriological Analytical Manual for Foods, 1976), each of 2 mice was inoculated intraperitoneally with 0.5 ml of the extract from the test sample. Mice were held for up to 4 days and examined for symtoms and death characteristic of C. botulinum intoxication. When death occurred, 2 additional mice were challenged with a sample-antitoxin mixture which was preincubated at 37° C. for 30 min. Unprotected controls were again inoculated so that they could be tested simultaneously with the protected mice. Nonspecific deaths due to the cheese extract did not occur.

Cheese: A blend of American cheese, nonfat dry milk, and whey solids was employed. This was blended, a uniform product was sealed in moisture-proof plastic bags and held frozen until needed. This method of preparation insured a uniform source of raw material for all experiments. The blend was prepared with the lowest possible moisture content. The amount of nisin naturally present in this product was determined to be below the lower limit of detectability of the nisin bioassay according to Tramer et al, J. Sci. Food Agric., 15:522-528 (1964).

Formulations: Five batches of process cheese spread were prepared. Batch #1 was made to 54% moisture with 1.35% sodium phosphate, 1.1% added sodium chloride, and 0.2% lactic acid. This batch served as a low spoilage control. Batches 2 through 5 were prepared at 58% moisture with 1.45% sodium phosphate and 1.2% added sodium chloride. Batch 2 contained no nisin; Batch 3 had 12.5 ppm nisin; Batch 4 contained 100 ppm nisin; and Batch 5 contained 250 ppm nisin. The formulations of the various batches are tabulated in Table 1.

TABLE 1

| | Formulation of Process Cheese Spreads | | | |
|---|---|---|---|---|
| Batch No. | Percent Moisture | % Sodium Phosphate | % Added Sodium Chloride | ppm Nisin |
| 1 | 54 | 1.35 | 1.1 | 0 |
| 2 | 58 | 1.45 | 1.2 | 0 |
| 3 | 58 | 1.45 | 1.2 | 12.5 |
| 4 | 58 | 1.45 | 1.2 | 100 |
| 5 | 58 | 1.45 | 1.2 | 250 |

Preparation and inoculation of cheese spreads: The cheese was processed in an agitated, covered, steamjacketed kettle. The kettle accommodated the 3 lb. batches. Each batch was completed by making 4 sub-batches. With use of the small sub-batches, very careful control of moisture was obtained, and the sub-batches were very similar in composition.

The cheese blend, water, disodium phosphate, sodium chloride, lactic acid, and NISAPLIN, a commercial formulation with $1 \times 10^6$ i.u./g, 74.7% sodium chloride, and 23% nonfat dry milk solids, were weighed into the kettle. The mixture was heated to 88° C. and held for 2 minutes. Uninoculated samples were then withdrawn for moisture, pH, and salt analyses (see below). The C. botulinum spore mixture was then added to the remainder of the product to give a final spore level of 1000 spores/g. The temperature of the inoculated product was kept at 88° C. for a further 2 minutes with agitation.

The processed product was poured into small glass vials, approximately 21 g per vial, to just below the rim and the screw caps were closed tight. 180 vials were prepared from each batch. The filled vials were cooled in a refrigerator for at least 1 hour, placed in anaerobe jars, and incubated as indicated below.

Incubation and sampling schedule: Samples were incubated in 2 different ways. In the first method, samples were incubated for up to 48 weeks at 30° C. In the second method, samples were held at 4° C. for 8 weeks followed by incubation at 30° C. for up to 48 weeks.

Each experimental batch was examined for spoilage (gas, uneven color change, phase separation) at 0, 4, 8, 12, 16, 20, 24, 36, and 48 weeks and if applicable at 0 and 8 weeks of refrigerated storage. Samples were routinely tested for toxin at 0, 4, 8, 12, 16, 24, 36, and 48 weeks and if applicable after 8 weeks of refrigerated storage. In addition, samples that showed obvious signs of spoilage were tested for toxin as soon as spoilage was noticed. For toxin analysis, a minimum of 10 samples per batch were tested throughout.

The number of viable *C. botulinum* organisms were determined by the 5-tube MPN method on each batch immediately following the formulation of the batch. In addition, MPNs were performed on any samples that did not spoil or become toxic by the 48th week of storage (a maximum of 10 jars per batch).

Nisin analysis was performed on 10 jars of each batch at 0, 4, 8, 12, 16, 24, 36, and 48 weeks and, if applicable, at 0, 4, and 8 weeks of regrigerated storage.

Chemical analysis of the uninoculated samples: Total moisture and sodium chloride analyses were performed in triplicate by recommended AOAC methods. Two moisture procedures are given in the AOAC Manual (Assoc. Off. Anal. Chem., 12th ed., 1976) by the 100° C. vacuum oven procedure was used in this study. The procedure in Standard Methods for the Examination of Dairy Products (Bianco et al, 1972) was used to measure the pH of the finished product. Nisin analysis was performed by the *Micrococcus flavus* assay method of Tramer and Fowler, noted above.

Discussion of Results: The effectiveness of nisin in preventing the outgrowth of *C. botulinum* spores in process cheese spreads incubated at 30° C. for up to 48 weeks is shown in Table 2. A total of 7 toxic samples were found in Batch 1, the low moisture control, during the 48 week period. However in Batch 2, which had 57.0% moisture, all of the samples became toxic by the 8th week of storage. In Batch 3, which also had 57.0% moisture but also contained 12.5 ppm nisin, the majority of the samples became toxic by the 16th week of incubation although a few samples survived the entire 48-week period. Nisin at a level of 12.5 ppm delayed outgrowth and toxin production but did not prevent it. In contrast, very few toxic samples were obtained in Batches 4 and 5 during the 48-week incubation period. Analysis of samples from Batch 4, which had 56.8% moisture and 100 ppm nisin, yielded only 3 toxic samples during the entire period. No toxic samples were found during incubation of Batch 5, which had 56.7% moisture and 250 ppm nisin. The MPN data in Table 2 indicates that the spores remained viable during the incubation period but that their outgrowth was prevented by nisin. On the basis of this data it appears that Nisin exerts a sporostatic effect on spores in process cheese spreads.

TABLE 2

Toxin Production in Process Cheese Spreads Incubated at 30° C.

| Batch | % Moisture | Initial[b] MPN/g | Final[c] MPN/g | Number of Toxic Samples/Number of Samples Analyzed Randomly at the Following Weekly Inspection Periods: 0 | 4 | 8 | 12 | 16 | 24 | 36 | 48 |
|---|---|---|---|---|---|---|---|---|---|---|---|
| 1 | 52.4 ± 0.6 | $2.92 \times 10^3$ | $7.72 \times 10^3$ | 0/10 | 0/10 | 1/10 $+1^d$ | 2/10 | 0/10 | 0/10 | 2/10 $+2^c$ | 0/10 |
| 2 | 57.0 ± 0.3 | $4.95 \times 10^3$ | — | 0/4 | 4/10 $+68^d$ | 10/10 $+8^d$ | — | — | — | — | — |
| 3 | 57.0 ± 0.3 | $3.05 \times 10^3$ | $5.60 \times 10^2$ | 0/4 | 4/10 $+18^d$ | 7/10 $+20^d$ | 8/10 $+3^d$ | 8/10 $+1^d$ | — | — | 1/4 |
| 4 | 56.8 ± 1.0 | $2.38 \times 10^3$ | $4.00 \times 10^3$ | 0/4 | 0/10 | 1/10 $+1^d$ | 0/10 | 1/10 | 0/10 | 0/10 | 0/10 |
| 5 | 56.7 ± 0.3 | $2.40 \times 10^3$ | $4.50 \times 10^2$ | 0/4 | 0/10 | 0/10 | 0/10 | 0/10 | 0/10 | 0/10 | 0/10 |

[a]Mean ± std. deviation of moisture level in the individual sub-batches
[b]Mean of MPNs obtained for individual sub-batches
[c]Mean of MPNs obtained for 2 to 5 of the samples remaining at 48 weeks
[d]Additional number of spoiled and toxic samples identified at that sampling period The antibotulinal effectiveness of nisin in process cheese spreads was not altered appreciably by incubation of 4° C. for 8 weeks before incubation at 30° C. for 48 weeks (Table 3). As before, a limited number of toxic samples developed in Batch 1, the low moisture control. With Batches 2 and 3, spoilage and toxin production occurred early in the incubation period. With Batch 3, toxin production was not delayed by 12.5 ppm nisin as it seemed to be in the earlier experiment (Table 2). Again, a limited number of toxic samples were obtained with Batch 4, the 100 ppm nisin batch, and no toxic samples were found throughout the 48-week period at the 250 ppm nisin level, Batch 5.

TABLE 3

Toxin Production in Process Cheese Spreads
Held for 8 Weeks at 4° C. Before Incubation at 30° C.

| Batch | Initial[b] % Moisture | Final[c] MPN/g | MPN/g | −8[d] | 0 | 4 | 8 | 12 | 16 | 24 | 36 | 48 |
|---|---|---|---|---|---|---|---|---|---|---|---|---|
| 1 | 52.4 ± 0.6 | 2.92 × 10³ | 4.20 × 10³ | 0/10 | 0/10 | 0/10 | 2/10 | — | 0/10 +3 | 1/10 | 1/10 +2 | 0/10 |
| 2 | 57.0 ± 0.3 | 4.95 × 10³ | — | 0/10 | 0/10 | 10/10 +54[e] | 10/10 +5[e] | — | — | — | — | — |
| 3 | 57.0 ± 0.3 | 3.05 × 10³ | 1.50 × 10² | 0/10 | 0/10 | 9/10 +16[e] | 7/10 +22[e] | 3[e] | 2[e] | 1[e] | — | 1/2 |
| 4 | 56.8 ± 1.0 | 2.38 × 10³ | 2.60 × 10² | 0/10 | 0/10 | 0/10 | 3/10 | — | 2/10 | 1/10 | 0/10 | 0/10 |
| 5 | 56.7 ± 0.3 | 2.40 × 10³ | 2.50 × 10² | 0/10 | 0/10 | 0/10 | 0/10 | — | 0/10 | 0/10 | 0/10 | 0/10 |

[a]Mean ± std. deviation of moisture levels in the individual sub-batches
[b]Mean of MPN obtained for individual sub-batches
[c]Mean of MPNs obtained for 2 to 5 of the samples remaining at 48 weeks
[d]Data obtained at onset of 8-week period of refrigerated storage
[e]Additional number of spoiled and toxic samples identified at that sampling period Chicken Frankfurter Emulsions: The effectiveness of nisin in preventing toxin production by *Clostridium botulinum* in chicken frankfurther emulsions challenged the 1000 C. botulinium spores per gram was investigated in the following studies.

Bacterial cultures: a 10 strain mixture consisting of five strains each of *Clostridium botulinum* types A and B (A: 56, 62, 69, 77 and 90; B: 53, 113, 213, 13983, and Lamanna-okra) was used. Each strain was grown in a manner conducive to sporulation. The spore crops were harvested by centrifugation followed by thorough washing with sterile water. The final pellet was resuspended in sterile water to 10 ml, and the individual spore suspensions were stored frozen. A portion of each individual spore suspension was thawed and diluted in 0.1% peptone-water for enumeration of the spores (see below). After enumeration, suitable dilutions of the individual spore preparations in sterile water were made and combined to produce a mixed inoculum consisting of approximately equal numbers of each strain. These mixed spore preparations were suitably diluted in 0.1% peptone-water prior to addition to the frankfurter emulsion.

Enumeration of *C. Botulinum*: *C. botulinum* was enumerated by the 5-tube Most Probable Number technique using TPYG as the growth medium. For spore counts, the spore suspensions were diluted in 0.1% peptone-water and heat-shocked at 80° C. for 10 min. prior to enumeration. With the stored frankfurter samples, similar heat-shocking methods were used. Tubes showing bacterial growth were tested for the presence of toxin by the mouse protection assay. Only toxin-positive tubes were counted in determining the Most Probable Number of *C. botulinum*.

Media: TPYG medium consisted of 5% trypticase peptone, 0.5% Bacto-peptone, 2% yeast extract, 0.4% glucose, and 0.1% sodium thiogly-collate. The pH of TPYG medium was adjusted to 7 prior to autoclaving. The peptone-water consisted of 0.1% Bacto-peptone in deionized water. The pH of 0.1% peptone-water was not adjusted prior to autoclaving.

Antitoxin: *C. Botulinum* anti A/B toxin was obtained from a local source.

Extraction and assay of toxin: The procedure of Tanaka et al was used for the extraction and essay of the toxin. Briefly, the sample was weighed, transferred into a Stomacher bag, and an equal volume of gel-phosphate buffer, pH 6.2 (5), was added. The sample was then blended using a Stomacher (Model 400, Cooke Laboratory Products, Alexandria, Va.) for 2 min. After blending, the contents of the bag were filtered through cheesecloth. The mixture was centrifuged at 5000×g for 10 min. and the aqueous supernatant fraction was analyzed for the presence of toxin. The extraction procedure allows complete recovery of added toxin. For toxin assays of TPYG broth employed in the MPN procedure, the medium was centrifuged at 5000×g for 10 min., and the supernatant was analyzed for the presence of toxin.

In the mouse protection assay for botulinal toxin (see FDA Bacteriological Analytical Manual for Foods, 1976), each of two mice was innoculated intraperitoneally with 0.5 ml of the extract from the test sample. Mice were held for up to four days and examined for symptoms and death characteristic of *C. botulinum* intoxication. When death occurred, two additional mice were challenged with a sample-antitoxin mixture which was pre-incubated at 37° C. for 30 min. Unprotected controls were again inoculated so that they could be tested simultaneously with the protected mice. Nonspecific deaths due to the meat extracts did not occur.

Chicken frankfurters: A standard chicken frankfurter emulsion was obtained from ABC Research Laboratories. This emulsion consisted of mechanically deboned chicken meat, 550 ppm sodium erythorbate, 2.0% dextrose, 0.25% white pepper, 0.07% nutmeg, and 0.5% liquid smoke. Salt at 2.5% was added during the inoculation phase. The proximate composition of the emulsion was approximately 12% protein, 20% fat, and 67% moisture.

Formulations for chicken frankfurter emulsions: Chicken frankfurter emulsions were prepared at 5 different nisin levles: 0, 12.5 ppm, 100 ppm, 250 ppm and 500 ppm. Three different nitrite levels will also be employed: 0, 40ppm, 80 ppm and 120 ppm. Previous experience has indicated that emulsions made with these levels of nitrite and no additional antibotulinal agents will support the outgrowth and toxin production by *C. botulinum*. In addition, a control batch containing 156 ppm nitrite and no nisin was prepared. Chicken frankfurter emulsions made with 156 ppm nitrite should not support botulinal outgrowth since this is the level of nitrite added commercially. A total of 22 different formulations with different combinations of nitrite and nisin were evaluated. Some batches were prepared on two separate occasions so that a portion of the study could be repeated.

Preparation and inoculation of chicken frankfurther emulsions: With a mixer, the prepared chicken frankfurter emulsion, the heat-shocked (80° C., 10 min.) spore inoculum, sodium nitrite and/or nisin, and salt were mixed. The salt was added last to avoid extraction of salt-soluble proteins which would result in a sticky emulsion with poor mixing properties. The spores and antibotulinal agents were well mixed before addition of the salt. The final spore load approximated 1000 spores per gram of emulsion. After mixing the emulsion was placed in 18×150 mm test tubes. The tubes were heat processed in a forced air oven. The product was slowly cooked to a final internal temperature of approximately 71° C. over approximately a 2 hour period. After cooking, the tubes were cooled, capped with vaspar, and incubated as described below.

Incubation and sampling schedule for chicken frankfurter emulsions: Samples were incubated in two different ways. In the first method, tubes were held at 27° C. for up to 6 weeks. In the second method, tubes were held at 4° C. for 8 weeks followed by incubation at 27° for up to 6 weeks. The second method was invoked to study the effects of nisin decomposition in chicken frankfurters during refrigerated storage and any resultant impact on the antibotulinal effectiveness of nisin. The decreased effectiveness of nisin in cooked meat medium was attributed to its binding to meat particles (Scott and Taylor, noted above). The slow decomposition of nisin in food systems has been observed previously. These factors may decrease the effectiveness of nisin in meat systems. The 27° C. incubation temperature was chosen because this abuse temperature has been widely used in previous studies on botulinal outgrowth in meat systems.

Each experimental batch was examined for spoilage (gas, uneven color, phase separation, liquefaction) at weekly intervals following incubation at 27° C. Each week, 7 samples were removed: 5 for toxin analysis and 2 for nisin analysis. Tubes with evidence of spoilage were preferentially selected. The tubes selected for refrigerated storage were sampled for nisin levels at 0, 4, and 8 weeks of refrigerated storage. After transfer to 27° C. incubation, the sampling schedule was identical to that given above.

Each batch of the chicken frankfurter emulsion was analzyzed for residual nitrite, number of viable *C. botulinum* organisms, fat, moisture, and pH after mixing and preparation were complete but prior to incubation.

Chemical analyses: The pH of the chicken frankfurter emulsion was determined by placing the electrode directly in the mixture. Fat, moisture, NaCl, and residual nitrite were determined by standard AOAC methods. Nisin analysis was performed by the *Micrococcus flavus* assay method of Tramer and Fowler, J. Sci. Food Agric. 15:522–528.

Results and Discussion. The formulations used in the various batches are reported in Table 4. Twenty-two different batches were used. Two batches were prepared at 12.5 ppm nisin. When the batch with 12.5 ppm nisin and 80 or 120 ppm nitrite did not prevent toxin formtion, it was obvious that batches prepared at 12.5 ppm nisin and either 0 or 40 ppm nitrite would not yields valuable information. A similar logic was used to eliminate the batch containing 100 pm nisin and 40 ppm nitrite. Batches were added that contained 500 ppm nisin and either 0 or 40 ppm nitrite in an attempt to determine if such high nisin levels would provide complete protection.

Each batch was analyzed for moisture content, fat content, and pH immediately after formulation. The data is included in Table 4. The moisture levels ranged from 58.5% to 66.9% which was slightly below the original goal of 67% moisture. Some moisture was probably lost during the heating process. The fat content ranged from 18.6% to 24.7% which conformed closely to the goal of 20% fat. The pH range for the various batches was from pH 5.5 to pH 6.2 with all but one batch falling in the range of pH 5.9 to pH 6.2. The actual spore loads obtained in each batch of emulsion were estimated following formulation (Table 4). Spore loads ranged from 220 to 2600 spores/g but 9 of the 13 batches were in the range of 800 to 2300 spores/g. Spore counts are notoriously inaccurate so these counts should be considered as estimates. The internal temperature achieved with each batch of emulsion in the heating process is also given in Table 4. The final internal temperatures ranged from 66° C. to 74° C.

TABLE 4

Analysis of Chicken Frankfurter Formulations

| Batch No. | Formulation | Moisture (%) | Fat (%) | pH | Spore Count (spores/g) | Final Internal Temp. (° C.) |
|---|---|---|---|---|---|---|
| 1 | 500 ppm nisin<br>0 ppm nitrite | 63.6 | 20.0 | 5.9 | 800 | 71 |
| 2 | 500 ppm nisin<br>40 ppm nitrite | 58.8 | 18.9 | 5.9 | 1500 | 72 |
| 3 | 250 ppm nisin<br>0 ppm nitrite | 64.4 | 22.1 | 5.5 | 270 | 73 |
| 4 | 250 ppm nisin<br>40 ppm nitrite | 61.8 | 20.0 | 6.0 | 1700 | 72 |
| 5 | 250 ppm nisin<br>120 ppm nitrite | 64.3 | 18.6 | 6.0 | 1200 | 68 |
| 6 | 250 ppm nisin<br>250 ppm nitrite | 63.1 | 20.2 | 5.9 | 1500 | 69 |
| 7 | 100 ppm nisin<br>0 ppm nitrite | 63.3 | 18.6 | 6.1 | 2600 | 68 |
| 8 | 100 ppm nisin<br>120 ppm nitrite | 65.4 | 18.6 | 6.1 | 220 | 74 |
| 9 | 12.5 ppm nisin<br>120 ppm nitrite | 63.5 | 18.8 | 6.1 | 1700 | 72 |
| 10 | 0 ppm nisin<br>0 ppm nitrite | 61.8 | 21.7 | 6.0 | 1700 | 71 |
| 11 | 0 ppm nisin<br>40 ppm nitrite | 63.5 | 24.1 | 6.0 | 1800 | 72 |
| 12 | 0 ppm nisin<br>120 ppm nitrite | 66.9 | 24.7 | 6.0 | 220 | 72 |
| 13 | 0 ppm nisin<br>156 ppm nitrite | — | — | — | 2300 | 66 |

Several batches of frankfurter emulsion were formulated a second time so that a portion of the study could be repeated. The data on added levels of nisin and nitrite, % moisture, % fat, pH, spore count, and final internal temperature for these batches is provided in Table 5. For these batches, a separate lot of frankfurter emulsion prepared to identical specifications was obtained from ABC Research Laboratories. The data in Table 5 indicate that the moisture levels obtained in these batches were a little higher, and the fat content was a little lower. Temperature control was improved because a different and better oven was used.

TABLE 5

| Batch No. | Formulation | Moisture (%) | Fat (%) | pH | Spore Count (spores/g) | Final Internal Temp. (° C.) |
|---|---|---|---|---|---|---|
| 14 | 0 ppm nisin<br>156 ppm nitrite | 69.0 | 13.4 | 6.14 | 1100 | 71 |
| 15 | 0 ppm nisin<br>120 ppm nitrite | 67.7 | — | 6.0 | 1050 | 72.5 |
| 16 | 12.5 ppm nisin<br>120 ppm nitrite | 69.4 | — | 6.1 | 1100 | 71 |
| 17 | 100 ppm nisin | 67.0 | — | 6.0 | 3000 | 71 |

TABLE 5-continued

| Batch No. | Formulation | Moisture (%) | Fat (%) | pH | Spore Count (spores/g) | Final Internal Temp. (° C.) |
|---|---|---|---|---|---|---|
| 18 | 120 ppm nitrite 250 ppm nisin | 64.9 | — | 6.1 | 5000 | 71 |
| 19 | 120 ppm nitrite 0 ppm nisin | 58.5 | 17.8 | 6.2 | 2200 | 71 |
| 20 | 80 ppm nitrite 12.5 ppm nisin | 66.1 | 11.8 | 6.1 | 2000 | 71 |
| 21 | 80 ppm nitrite 100 ppm nisin | 59.0 | 15.4 | 6.1 | 1100 | 69 |
| 22 | 80 ppm nitrite 250 ppm nisin | 63.4 | 16.8 | 5.9 | 1700 | 69 |

The results of the analysis for botulinal toxin following incubation was shown in Tables 6 and 7. The results from the 27° C. incubation are shown in Table 6. Table 7 gives the results obtained with 8 weeks of refrigerated storage followed by incubation at 27° C. As mentioned previously, some batches were repeated. The results are recorded separately on Tables 6 and 7.

found in the emulsion containing 156 ppm nitrite after two weeks of incubation.

Unfortunately, the incubation of the negative control had to be discontinued at this point due to heavy bacterial growth and gas production. The bacteria growing in the 156 ppm emulsion were not *C. botulinum* but some unidentified bacteria, perhaps lactics. This non-botulinal growth was only observed with this particular batch of emulsion. Other batches that showed signs of bacterial growth also had toxin indicating that at least some of the growth was *C. botulinum*. This problem with the 156 ppm nitrite control was eliminated in the second trial probably due to improved temperature control during cooking. The 156 ppm control batch did not become toxic until the fourth week in this second experiment (Table 6).

Nisin and nitrite worked together to prevent or delay botulinal toxin production in chicken frankfurter emulsions. In batches containing 120 ppm nitrite and either 100 or 250 ppm nisin, toxin formation was delayed until the fifth or sixth week of incubation at 27° C. Intermediate effects were noted with combinations of 80 ppm nitrite with 100 or 250 ppm nisin. This is an improve-

TABLE 6

Botulinal Toxin Formation in Chicken Frankfurter Emulsions Incubated at 27° C.
Number of toxic samples/Number of samples tested

| | ppm nisin | | | | | | | | | | | | | | | | | |
|---|---|---|---|---|---|---|---|---|---|---|---|---|---|---|---|---|---|---|
| | 500 | 500 | 250 | 250 | 250 | 250 | 250 | 100 | 100 | 100 | 12.5 | 12.5 | 0 | 0 | 0 | 0 | 0 | 0 |
| | | | | | | | | | ppm nitrite | | | | | | | | | |
| Week | 40 | 0 | 250 | 120 | 80 | 40 | 0 | 120 | 80 | 0 | 120 | 80 | 156 | 156 | 120 | 40 | 80 | 0 |
| 0 | 0/3 | 0/3 | 0/3 | 0/3 | 0/2 | 0/3 | 0/3 | 0/3 | 0/2 | 0/3 | 0/3 | 0/2 | 0/2 | 0/2 | 0/3 | 0/3 | 0/2 | 0/3 |
| 1 | 1/5 | 0/5 | 0/5 | 0/5 | 0/5 | 5/5 | 5/5 | 0/5 | 0/5 | 0/5 | 2/5 | 4/5 | 0/10 | 0/5 | 5/5 | 5/5 | 5/5 | 5/5 |
| 2 | 2/5 | 5/5 | 0/5 | 0/5 | 1/5 | — | — | 0/5 | 3/5 | 5/5 | 1/5 | 5/5 | 0/10 | 1/5 | — | — | — | — |
| 3 | 1/5 | 5/5 | 0/5 | 0/5 | 4/5 | — | — | 0/5 | 5/5 | — | 1/5 | — | — | 0/5 | — | — | — | — |
| 4 | 1/5 | — | 0/5 | 0/5 | 5/5 | — | — | 0/5 | — | — | 0/5 | — | — | 9/10 | — | — | — | — |
| 5 | 4/5 | — | 0/5 | 0/5 | — | — | — | 1/5 | — | — | 7/7 | — | — | — | — | — | — | — |
| 6 | 4/4 | — | 0/5 | 1/5 | — | — | — | 6/6 | — | — | — | — | — | — | — | — | — | — |

TABLE 7

Botulinal Toxin Formation In Chicken Frankfurter Emulsion Incubated In The Refrigerator For 8 Weeks And Then At 27° C.
Number of toxic samples/Number of samples tested

| | ppm nisin | | | | | | | | | | | | | | | | | |
|---|---|---|---|---|---|---|---|---|---|---|---|---|---|---|---|---|---|---|
| | 500 | 500 | 250 | 250 | 250 | 250 | 250 | 100 | 100 | 100 | 12.5 | 12.5 | 0 | 0 | 0 | 0 | 0 | 0 |
| | | | | | | | | | ppm nitrite | | | | | | | | | |
| Week | 40 | 0 | 250 | 120 | 120 | 40 | 0 | 120 | 120 | 0 | 120 | 120 | 156 | 156 | 120 | 120 | 40 | 0 |
| 0[a] | 0/2 | 0/2 | 0/2 | 0/2 | 0/2 | 0/2 | 0/2 | 0/2 | 0/2 | 0/2 | 0/2 | 0/2 | — | 0/2 | 0/2 | 0/2 | 0/2 | 0/2 |
| 4 days[a] | — | — | — | — | — | — | 0/5 | — | — | 2/5 | — | — | — | — | 2/5 | — | 5/5 | 0/5 |
| 1[a] | 0/5 | 0/5 | 0/5 | 2/5 | 1/5 | 5/5 | 5/5 | 2/5 | 4/5 | 5/5 | 4/5 | 10/10 | — | 4/5 | 5/5 | 5/5 | 5/5 | 5/5 |
| 2[a] | 4/5 | 2/5 | 0/5 | 3/5 | 10/10 | — | — | 5/5 | 10/10 | — | 5/5 | — | — | 10/10 | — | — | — | — |
| 3[a] | 5/5 | 5/5 | 5/5 | 5/5 | — | — | — | — | — | — | — | — | — | — | — | — | — | — |

[a]Incubation period at 27° C.

Nisin alone, even at 500 ppm, did not prevent botulinal outgrowth and toxin production in chicken frankfurter emulsion. Nisin at 500 ppm did delay toxin production by one week. At lower nisin concentrations in the absence of nitrite, toxin was present in all tubes by the end of one week of incubation at 27° C. Likewise, nitrite alone at levels up to 120 ppm did not prevent botulinal outgrowth and toxin production. All tubes were positive for toxin by the end of the first week of incubation at 27° C. This lack of botulinal inhibition at levels of 120 ppm or less of nitrite was expected based on earlier work in chicken frankfurter emulsions by Sofos et al, J. Food Sci. 44:668–672 (1973). The negative control containing no nisin and 156 ppm nitrite was not expected to allow toxin production in the first few weeks of incubation. In the first trial, no toxin was ment over the protection provided by 156 ppm nitrite alone (Table 6). Toxin formation was totally prevented in the batch prepared with 250 ppm nisin and 250 ppm nitrite but, since no control was available with 250 ppm nitrite alone, no conclusions can be reached regarding the role of nisin in this result. Toxin formation was slowed and sporadic in batches containing 12.5 ppm nisin and 120 ppm nitrite or 500 ppm nisin and 40 ppm nitrite.

These studies demonstrate the effectiveness of using nisin at appropriate levels suited to the product in question to control the growth of *C. botulinum* spores.

What is claimed is:

1. A process for controlling the growth of *Clostridium botulinum* spores and the elaboration of botulinum toxin therefrom in a food product excluding a high moisture content pasteurized process cheese product, said process comprising adding to said product an amount of nisin or a nisin-producing culture sufficient to inhibit botulinum spore growth.

2. The process according to claim 1 in which from about 2,000 to about 10,000 International Units of nisin are added per gram of food product.

3. A food product containing from about 100 to about 300 parts per million nisin produced by the process of claim 1.

4. The process as claimed in claim 1 in which an amount of at least 2000 Internation Units (50 ppm) of nisin is added or incorporated per gram of food product.

5. The process as claimed in claim 4 in which an amount of at least 4000 International Units (100 ppm) of nisin is added or incorporated per gram of food product.

6. A process as claimed in claim 4 in which an amount up to 12,000 International Units (300 ppm) of nisin is added or incorporated per gram of food product.

7. A food product excluding a high moisture content pasteurized process cheese product, said food product containing an amount of nisin or a nisin-producing culture sufficient to inhibit botulinum spore growth.

8. The food product as claimed in claim 7 containing at least 2,000 IU (50 ppm) of nisin.

9. A process for controlling the growth of *Clostridium botulinum* spores and the elaboration of botulinum toxin therefrom in a food product selected from the group consisting of tomato products, cold meat products and wet fish systems, said process comprising adding to said food product from about 2,000 to about 10,000 International Units of nisin or a nisin-producing culture per gram to inhibit botulinum spore growth.

10. The process as claimed in claim 9 in which an amount of at least 2,000 International Units (50 ppm) of nisin is added or incorporated per gram of food product.

11. The process as claimed in claim 10 in which an amount of at least 4,000 International Units (100 ppm) of nisin is added or incorporated per gram of food product.

12. A process as claimed in claim 10 in which an amount up to 12,000 International Units (300 ppm) of nisin is added or incorporated per gram of food product.

13. The process as claimed in claim 9 in which the food product is a tomato product.

14. The process as claimed in claim 9 in which the food product is a wet fish system.

15. The process as claimed in claim 9 in which the food product is a cold meat product.

16. The process as claimed in claim 15 in which the product is chicken frankfurter emulsion.

* * * * *